(12) United States Patent
Higuchi et al.

(10) Patent No.: US 7,579,558 B2
(45) Date of Patent: Aug. 25, 2009

(54) COMBINATION WEIGHER

(75) Inventors: Hiroshi Higuchi, Takasago (JP); Shozo Kawanishi, Nishinomiya (JP); Taketoshi Okamura, Aahiya (JP)

(73) Assignee: Yamato Scale Co., Ltd., Akashi-shi (JP)

( * ) Notice: Subject to any disclaimer, the term of this patent is extended or adjusted under 35 U.S.C. 154(b) by 0 days.

(21) Appl. No.: 11/719,920

(22) PCT Filed: Nov. 9, 2005

(86) PCT No.: PCT/JP2005/020502

§ 371 (c)(1), (2), (4) Date: Nov. 27, 2007

(87) PCT Pub. No.: WO2006/057159

PCT Pub. Date: Jun. 1, 2006

(65) Prior Publication Data

US 2008/0121439 A1 May 29, 2008

(30) Foreign Application Priority Data

Nov. 24, 2004 (JP) ............................. 2004-338330

(51) Int. Cl.
*G01G 19/387* (2006.01)
*B65B 1/32* (2006.01)
*B65B 57/00* (2006.01)
*B65B 9/02* (2006.01)

(52) U.S. Cl. .................. 177/25.18; 53/493; 53/502; 53/75

(58) Field of Classification Search ............. 53/493, 53/502, 75; 177/25.18
See application file for complete search history.

(56) References Cited

U.S. PATENT DOCUMENTS 4,844,190 A * 7/1989 Mikami et al. ........... 177/25.18

(Continued)

FOREIGN PATENT DOCUMENTS

JP 62-143601 9/1987

(Continued)

OTHER PUBLICATIONS

International Search Report for PCT/JP2005/020502, dated Dec. 1, 2005.

*Primary Examiner*—Randy W Gibson
(74) *Attorney, Agent, or Firm*—Marshall, Gerstein & Borun LLP

(57) ABSTRACT

A combination weigher of the present invention has a relationship with the packaging machine in which, a bag accommodating time required to accommodate the objects to be weighed falling from the collecting hopper (4) into the bag in a case where the gate of the collecting hopper (4) is always kept open, is longer than a seal stopping time after completion of sealing a lower end of any one of the bags successively manufactured by the packaging machine (21) before start of sealing an upper end of the bag, wherein the control unit (10) causes the gate of the collecting hopper (4) to be closed immediately before any portion of the objects to be weighed discharged from the weighing hoppers (1) arrives at the collecting hopper (4) at the latest, and causes the gate of the collecting hopper (4) to be opened before all of the objects to be weighed arrive at the collecting hopper (4) and after a specified time that elapses from when the gate of the collecting hopper (4) is closed, such that by keeping the gate of the collecting hopper closed for the specified time, the bag accommodating time is reduced to be equal to or less than the seal stopping time of the packaging machine.

4 Claims, 6 Drawing Sheets

U.S. PATENT DOCUMENTS

| | | | |
|---|---|---|---|
| 5,258,580 A * | 11/1993 | Bergholt | 177/25.18 |
| 6,233,902 B1 * | 5/2001 | Nakagawa | 53/55 |
| 6,421,981 B1 * | 7/2002 | Nakagawa et al. | 53/58 |
| 6,427,425 B1 * | 8/2002 | Nakagawa et al. | 53/551 |
| 2002/0035822 A1 * | 3/2002 | Nakagawa et al. | 53/493 |
| 2002/0121076 A1 * | 9/2002 | Nakagawa et al. | 53/493 |
| 2008/0047761 A1 * | 2/2008 | Kawanishi et al. | 177/25.18 |

FOREIGN PATENT DOCUMENTS

| | | |
|---|---|---|
| JP | 5-99732 | 4/1993 |
| JP | 10-77002 | 3/1998 |
| JP | 10-077002 A | 3/1998 |
| JP | 3028384 B | 2/2002 |

* cited by examiner

COMBINATION WEIGHER

TECHNICAL FIELD

The present invention relates to a combination weigher which feeds objects to be weighed to a packaging machine or the like.

BACKGROUND ART

Objects to be weighed, such as confectionary or the like, which are weighed by a combination weigher to have a predetermined weight, are generally packaged by a packaging machine. A schematic construction of such a system that weighs and packages objects to be weighed is shown in FIG. 1.

The system shown in FIG. 1 includes a packaging machine 21 disposed below a combination weigher. The combination weigher, whose operation is entirely controlled by a control unit 10, includes a plurality of weighing hoppers 1 arranged in a circle shape, a collecting chute 3 provided below the plurality of weighing hoppers 1, and a collecting hopper 4 provided at an outlet of the collecting chute 3. To each weighing hopper 1, a feeding hopper (not shown) or the like disposed thereabove feeds objects to be weighed. Furthermore, each weighing hopper 1 is attached with a weight sensor (not shown), such as a load cell, which measures the weight of the objects to be weighed inside the weighing hopper 1 and sends the measured value to the control unit 10. The control unit 10 performs combination calculation based on the measured values of the plurality of the weighing hoppers 1, determines a combination of hoppers that will discharge the objects to be weighed, from among the plurality of weighing hoppers 1, and opens and closes gates 2 of the weighing hoppers 1 forming the combination, so that the objects to be weighed are discharged from the weighing hoppers 1. The objects to be weighed discharged from the weighing hoppers 1 slide down on the collecting chute 3, pass through the outlet provided at the lower part of the collecting chute 3 to be temporarily accumulated in the collecting hopper 4, and then are sent out to the packaging machine 21 when a gate 5 of the collecting hopper 4 is opened and closed under the control of the control unit 10.

The packaging machine 21, while manufacturing bags, fills the objects to be weighed discharged from the combination weigher in these bags for packaging. In this packaging machine 21, a sheet of a wrapping material 27 withdrawn from a roll 26 of the wrapping material is caused to be wound around a forming tube 23 to form a cylindrical shape, is suctioned by a pulldown belt (not shown) to be transferred downward, and the superposed vertical edges of the cylindrically formed wrapping material are sealed (sealing by fusion adhesion) by a vertical sealing machine 24. Then, the objects to be weighed which have been weighed by the combination weigher fall into a funnel 22 of the packaging machine, pass through the forming tube 23, and are filled into a preceding bag 28. A horizontal sealing machine 25 disposed under the forming tube 23 performs a horizontal sealing (sealing by fusion adhesion) across the upper end of the preceding bag 28 and the lower end of the following bag. This horizontal sealing forms the preceding bag 28 into a complete bag with its upper and lower ends sealed, because the lower end has been sealed by the previous horizontal sealing. The horizontally sealed portion is then cut at the center by a cutter built in the horizontal sealing machine 25 so that the preceding bag and the following bag are separated from each other.

With regard to the above construction, a timing chart is shown in FIG. 5, which illustrates the operation of the combination weigher and the packaging machine in the case where the combination weigher is not provided with the collecting hopper 4. In FIG. 5, T1 indicates a discharge cycle time of the combination weigher, and T2 indicates a packaging cycle time that consists of a stopping time Tc and an operating time (sealing time) Td of the horizontal sealing machine 25 of the packaging machine 21. Since the combination weigher and the packaging machine operate in association with each other, T1 and T2 become an equal time. Also, Ta indicates a gate open time of the weighing hopper 1, and Tb indicates a bag accommodating time required to accommodate from tip to tail of a bath of the objects to be weighed discharged from the combination weigher into the bag 28 in the packaging machine 21.

In this case, because of the absence of the collecting hopper 4, the objects to be weighed discharged from the weighing hoppers 1 slide down on the collecting chute 3 and fall directly from the outlet of the collecting chute 3 into the funnel 22 of the packaging machine 21. At this time, due to the fact that the objects to be weighed bounce back and thereby move in unwanted directions on the collecting chute 3, or due to the unevenness in friction of objects to be weighed with the collecting chute 3, there are variations in arrival time of the objects to be weighed at the outlet of the collecting chute 3, thereby increasing the length of from tip to tail of the batch of the objects to be weighed discharged from the outlet of the collecting chute 3, and thus increasing the time taken from the fall of the objects to be weighed until they are completely accommodated into the bag 28. As shown in FIG. 5, the gate 2 of the weighing hopper 1 is opened during the time Ta, and all of the objects to be weighed are discharged from the weighing hopper 1 within this time Ta. On the other hand, the bag accommodating time Tb required to accommodate from the tip to tail of the batch of the objects to be weighed into the bag 28 of the packaging machine 21 is longer than the gate open time Ta of the weighing hopper 1. With the speed up of packaging machines in recent years, if the stopping time Tc of the horizontal sealing machine 25 is shortened, and the bag accommodating time Tb becomes longer than the stopping time Tc of the horizontal sealing machine 25 as shown in FIG. 5, the objects to be weighed arrive during the operation of the horizontal sealing machine 25, so that the objects to be weighed get stuck at the horizontal sealing machine 25. This causes not only the production of defective packages, but also damages to the horizontal sealing machine 25.

For the above stated reason, the collecting hopper 4 is conventionally provided so as to temporarily accumulate the objects to be weighed discharged from the weighing hoppers 1 in the collecting hopper 4 before being discharged into the packaging machine 21. FIG. 6 shows the timing chart, illustrating the operation of the combination weigher and the packaging machine in that case. In FIG. 6, Te indicates a gate open time of the collecting hopper 4, Tf indicates a gate close time, and Tg indicates time required to accommodate all of the objects to be weighed discharged from the weighing hoppers 1 into the collecting hopper 4.

In this case, since all of the objects to be weighed discharged from the weighing hoppers 1 are temporarily accumulated in the collecting hopper 4, and then discharged into the packaging machine 21, the bag accommodating time Tb of the objects to be weighed in the packaging machine 21 is reduced, so that the objects to be weighed are entirely accommodated in the bag within the stopping time Tc of the horizontal sealing machine 25.

DISCLOSURE OF THE INVENTION

Problem to be Solved by the Invention

However, in the construction described above in which the collecting hopper 4 is provided, and the objects to be weighed discharged from weighing hoppers 1 are temporarily accumulated in the collecting hopper 4 and then discharged into the packaging machine 21, there has been a problem that, in the case of bulky (low in bulk density) objects to be weighed such as potato chips, they often get jammed inside the collecting hopper 4 and fail to fall when the gate 5 is opened, and that since the objects to be weighed accumulated in the collecting hopper 4 are discharged into the packaging machine at a time, they often get jammed inside the funnel 22 at the inlet of the packaging machine 21, inside the forming tube 23, and at the inlet of the packaging bag 28, so that the objects to be weighed fail to fall properly into the packaging bag 28.

The disclosed example of the present invention has been made to solve the problem as mentioned above, and an object thereof is to provide a combination weigher which can prevent the objects to be weighed from getting stuck in the packaging machine that is operated at high speeds, and can prevent the phenomenon in which the objects to be weighed get jammed and fail to fall at the collecting hopper or the like.

To achieve the above described object, a combination weigher assembled in accordance with the teachings of the present invention comprises: a plurality of combination hoppers that are fed with objects to be weighed; a collecting chute disposed below the plurality of combination hoppers, which collects the objects to be weighed discharged from the combination hoppers and discharges the objects to be weighed through an outlet provided at a lower part thereof; a collecting hopper provided at the outlet of the collecting chute, which, with a gate provided at a lower part thereof closed, receives the objects to be weighed discharged from the outlet of the collecting chute, and, with the gate opened, allows the objects to be weighed to fall into bags manufactured by a packaging machine; and a control means which determines a combination of combination hoppers that discharges the objects to be weighed, from among the plurality of combination hoppers, and causes the combination hoppers forming the determined combination to discharge the objects to be weighed, and which controls opening and closing of the gate of the collecting hopper, the combination weigher having a relationship with the packaging machine in which, a bag accommodating time required to accommodate from a first-to-arrive to last-to-arrive portion of the objects to be weighed falling from the collecting hopper into the bag in a case where the gate of the collecting hopper is always kept open and the objects to be weighed discharged from the combination hoppers are allowed to pass through the collecting hopper, is longer than a seal stopping time after completion of sealing a lower end of any one of the bags successively manufactured by the packaging machine before start of sealing an upper end of the bag, wherein the control means causes the gate of the collecting hopper to be closed immediately before any portion of the objects to be weighed discharged from the combination hoppers arrives at the collecting hopper at the latest, and causes the gate of the collecting hopper to be opened before all of the objects to be weighed arrive at the collecting hopper and after a specified time that elapses from when the gate of the collecting hopper is closed, such that by keeping the gate of the collecting hopper closed for the specified time, the bag accommodating time is reduced to be equal to or less than the seal stopping time of the packaging machine.

With this configuration, by keeping the gate of the collecting hopper closed for a specified time from prior to arrival of a portion of the objects to be weighed discharged from combination hoppers at the collecting hopper, the bag accommodating time is reduced to be equal to or less than the seal stopping time of the packaging machine, making it possible to prevent the objects to be weighed from getting stuck in the packaging machine and to thus properly accommodate from tip to tail, of a batch of the objects to be weighed into a bag. Furthermore, by opening the gate of the collecting hopper prior to arrival of all of the objects to be weighed at the collecting hopper, in other words, by opening the gate of the collecting hopper and discharging the objects to be weighed before all of the objects to be weighed discharged from combination hoppers are accumulated in the collecting hopper, the objects to be weighed can fall smoothly from the collecting hopper into the bag. As a result, the objects to be weighed can be prevented from getting jammed inside the collecting hopper or at the inlet of the bag in the packaging machine, and can thus be properly accommodated in the bag.

In the present invention, the combination hoppers may be weighing hoppers that weigh the weight of the objects to be weighed fed thereinto.

Furthermore, a weighing hopper may be disposed in correspondence to and above each of the combination hoppers, for weighing the weight of the objects to be weighed fed thereinto, and the combination hoppers may be memory hoppers that are fed with the objects to be weighed whose weight has been measured in the weighing hoppers.

Moreover, the plurality of combination hoppers may be disposed in two, upper and lower lines, the combination hoppers in the upper line being weighing hoppers for weighing the weight of the objects to be weighed fed thereinto, and the combination hoppers in the lower line being memory hoppers which are respectively provided in correspondence to the weighing hoppers and fed with the objects to be weighed having been weighed in the weighing hoppers, and the weighing hoppers selectively discharge the objects to be weighed to the corresponding memory hoppers or to the collecting chute.

The disclosed example of the present invention has the construction as described above, and a combination weigher has the effect of preventing the objects to be weighed from getting stuck in a high-speed operated packaging machine and of preventing the phenomenon in which the objects to be weighed get jammed and fail to fall at a collecting hopper or the like.

The above object, other objects, features, and advantages of the disclosed example of the present invention will be apparent by reading the following detailed description of a preferred embodiment of the invention, with reference being made to the accompanying drawings.

DESCRIPTION OF SYMBOLS

Figure 1:
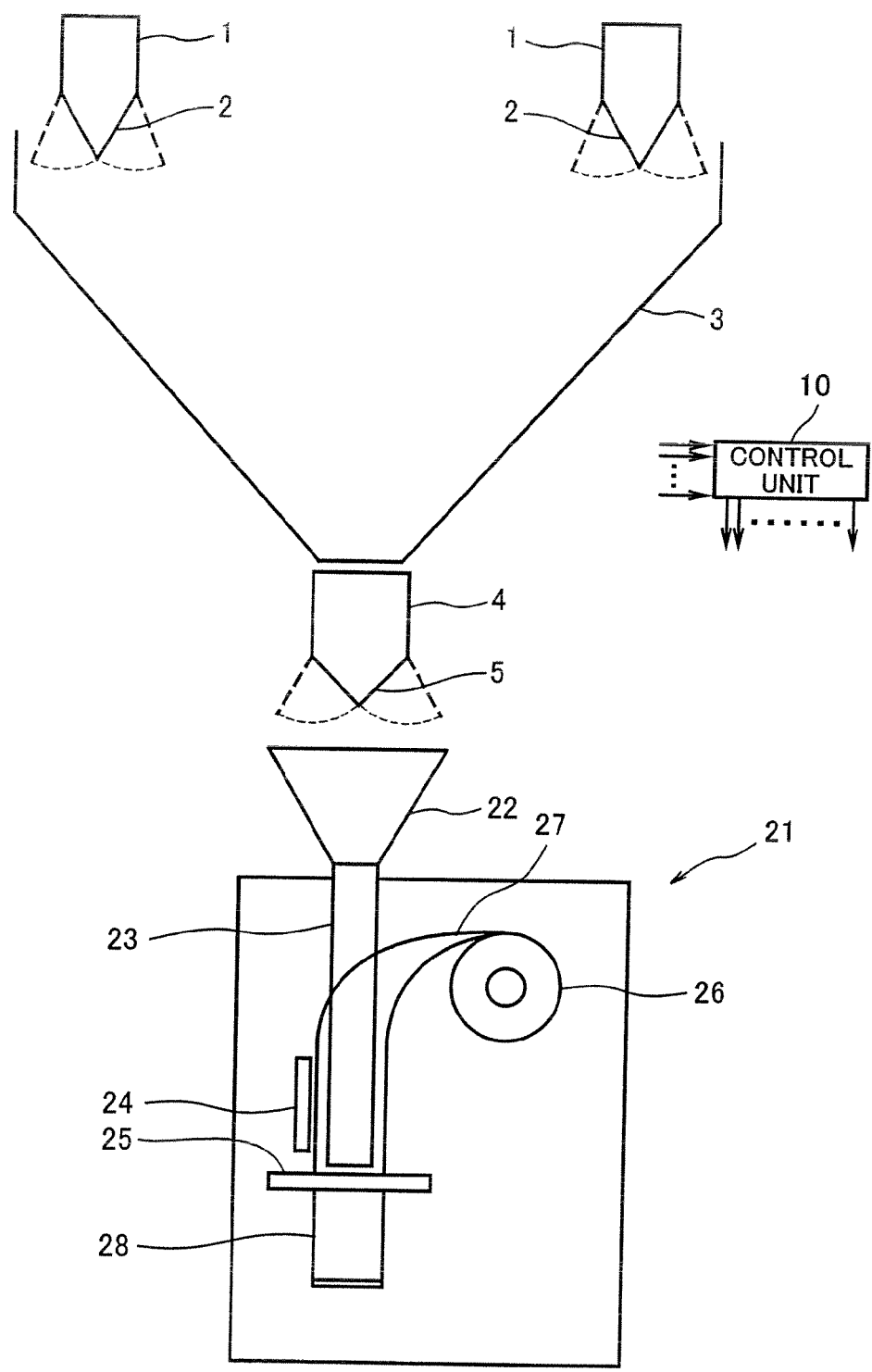
FIG. 1 is a schematic view showing a construction of a system made up of a combination weigher and a packaging machine according to an embodiment of the present invention.

1: Weighing hopper
2: Gate of weighing hopper
3: Collecting chute
4: Collecting hopper
5: Gate of collecting hopper
6: Memory hopper
7: Gate of memory hopper
10: Control unit
21: Packaging machine
25: Horizontal sealing machine
28: Bag

BEST MODE FOR CARRYING OUT THE INVENTION

Preferred embodiments of the present invention will hereinafter be described with reference to the drawings.

The schematic construction of a system comprising a combination weigher and a packaging machine according to an embodiment of the present invention is shown in the same FIG. 1 as for the prior art example, and detailed description of the packaging machine, made in connection with the prior art, will be omitted.

The operation of the combination weigher of this embodiment is entirely controlled by a control unit 10. The combination weigher includes a plurality of weighing hoppers 1 arranged in a circle shape, a collecting chute 3 provided below the plurality of weighing hoppers 1, and a collecting hopper 4 provided at an outlet at a lower part of the collecting chute 3. Each weighing hopper 1 is fed with the objects to be weighed from a feeding hopper or the like (not shown) disposed thereabove. Furthermore, each weighing hopper 1 is attached with a weight sensor (not shown), such as a load cell, which measures the weight of the objects to be weighed inside the weighing hopper 1, and sends the measured value to the control unit 10. The control unit 10 carries out combination calculation based on the measured values of a plurality of weighing hoppers 1 so as to select, from among the plurality of weighing hoppers 1, one combination of hoppers accommodating the objects to be weighed whose total weight falls within an allowable range with respect to a target weight. The control unit 10 opens and closes the gates 2 of the weighing hoppers 1 corresponding to the determined combination, so that the objects to be weighed are discharged from the weighing hoppers 1. The objects to be weighed discharged from weighing hoppers 1 slide down on the collecting chute 3, and are sent to the collecting hopper 4 through the outlet provided at the lower part of the collecting chute 3. The objects to be weighed are then sent out to the packaging machine 21 while the gate 5 of the collecting hopper 4 is open.

Figure 2:
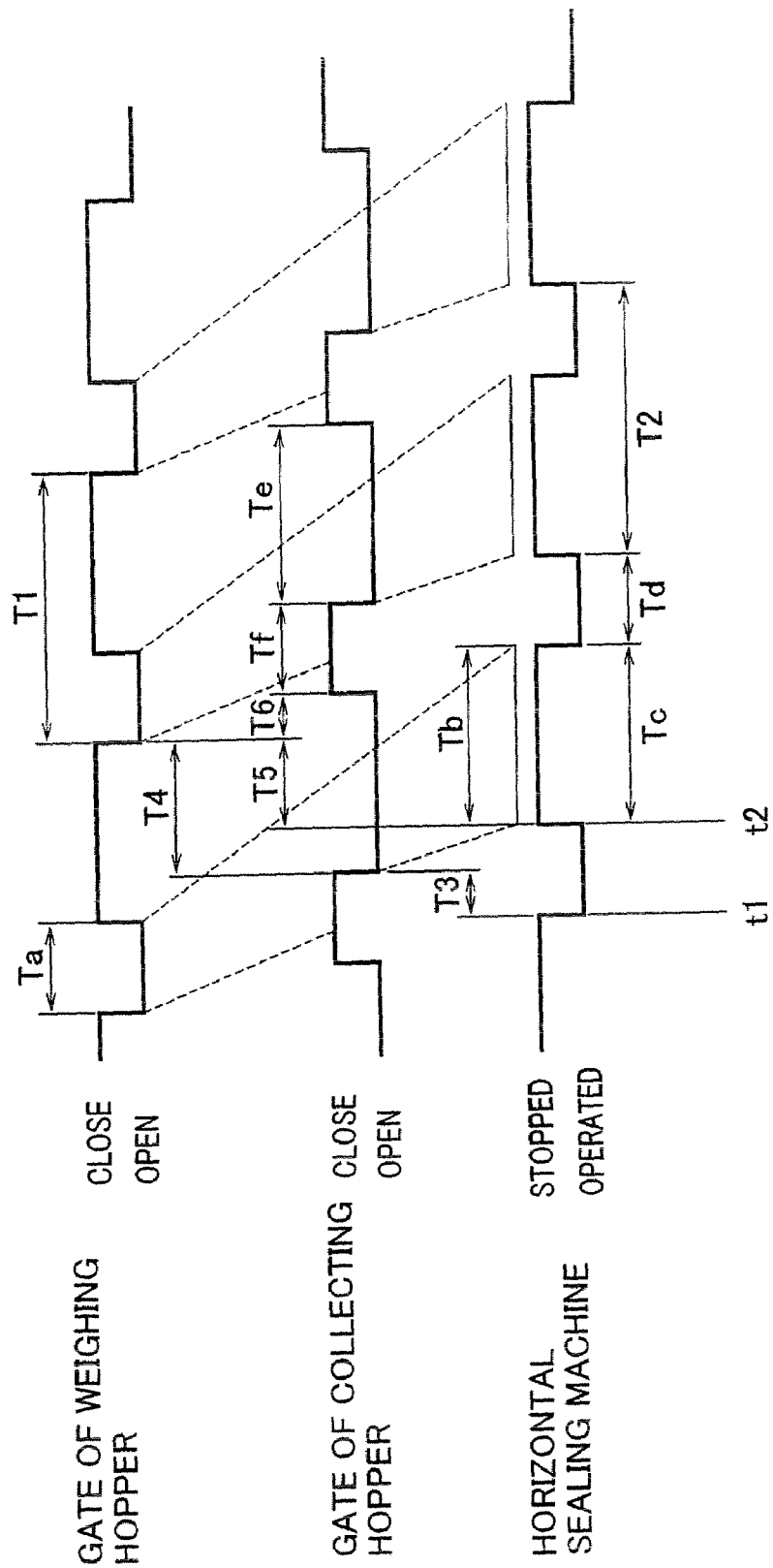
FIG. 2 is a timing chart showing an operation of the combination weigher and the packaging machine according to the embodiment of the present invention.

FIG. 2 is a timing chart showing the operation of the combination weigher and the packaging machine according to the embodiment of the present invention. In FIG. 2, T1 indicates a discharge cycle time of the combination weigher, and T2 indicates a packaging cycle time that consists of a stopping time Tc and an operating time (sealing time) Td of the horizontal sealing machine 25 of the packaging machine 21.

Since the combination weigher and the packaging machine operate in association with each other, T1 and T2 become an equal time. Also, Ta indicates a gate open time of the weighing hopper 1, and Tb indicates a bag accommodating time required to accommodate from tip to tail of a batch of the objects to be weighed discharged from the combination weigher into a bag 28 in the packaging machine 21. Te indicates a gate open time of the collecting hopper 4, and Tf indicates a gate close time of the collecting hopper 4. The operating time Td of the horizontal sealing machine 25 of the packaging machine 21 is a sealing time period during which the horizontal sealing machine 25 simultaneously seals (by fusion adhesion) the upper end of a preceding bag 28 and the lower end of a next following bag. The stopping time Tc of the horizontal sealing machine 25 is a sealing stopping time period between one sealing period and next sealing period in the process of sequentially manufacturing packages. In other words, when attention is paid to a particular bag, the stopping time Tc is the time that elapses from immediately after the completion of sealing of the lower end of the bag 28 until the start of sealing of the upper end of the bag 28. If one batch of the objects to be weighed discharged from the combination weigher can entirely be accommodated into the bag 28 within that time, then the objects to be weighed will not get stuck at the horizontal sealing machine 25.

Figure 6:
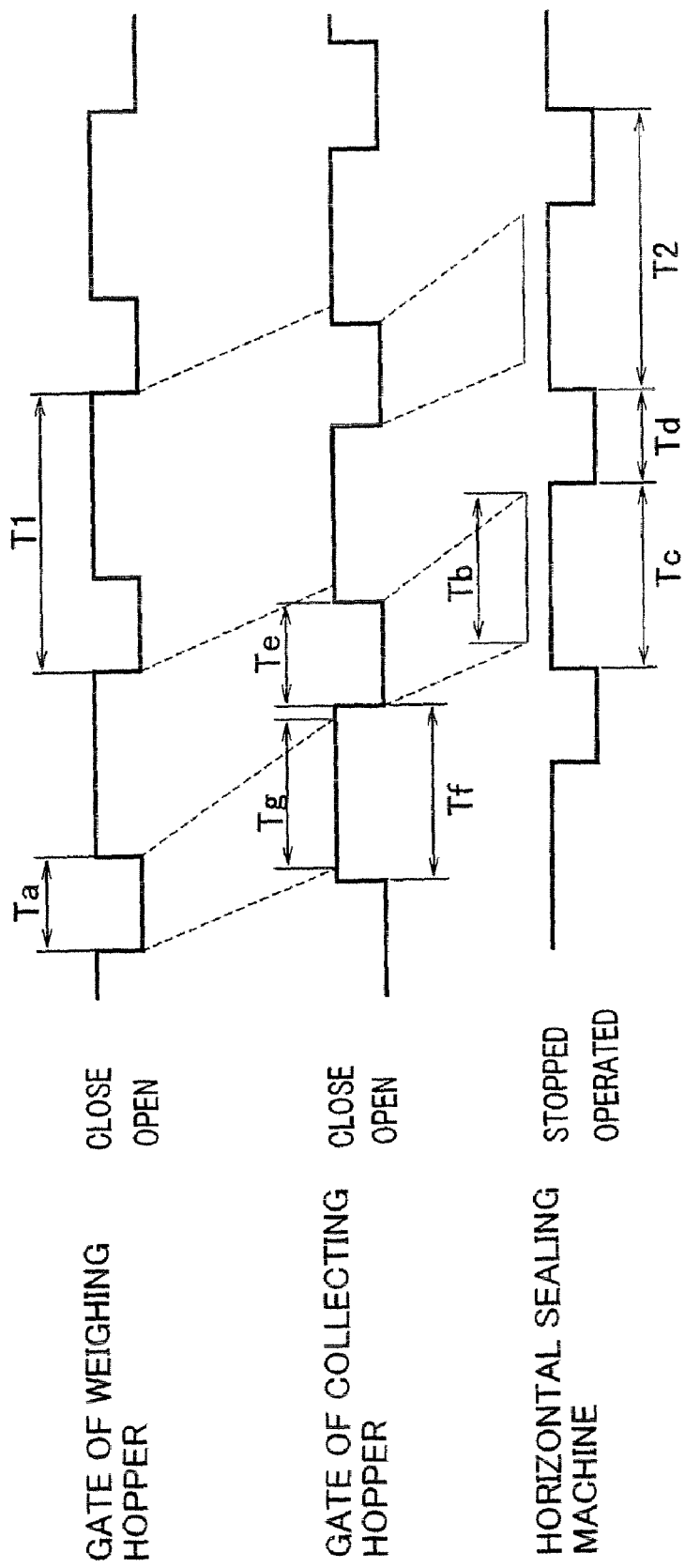
FIG. 6 is a timing chart showing an operation of a conventional combination weigher which is provided with the collecting hopper and a packaging machine.

The timing chart of this embodiment shown in FIG. 2 and the timing chart of a conventional example shown in FIG. 6 differ in opening and closing timing of the gate 5 of the collecting hopper 4 that is controlled by the control unit 10.

Figure 5:
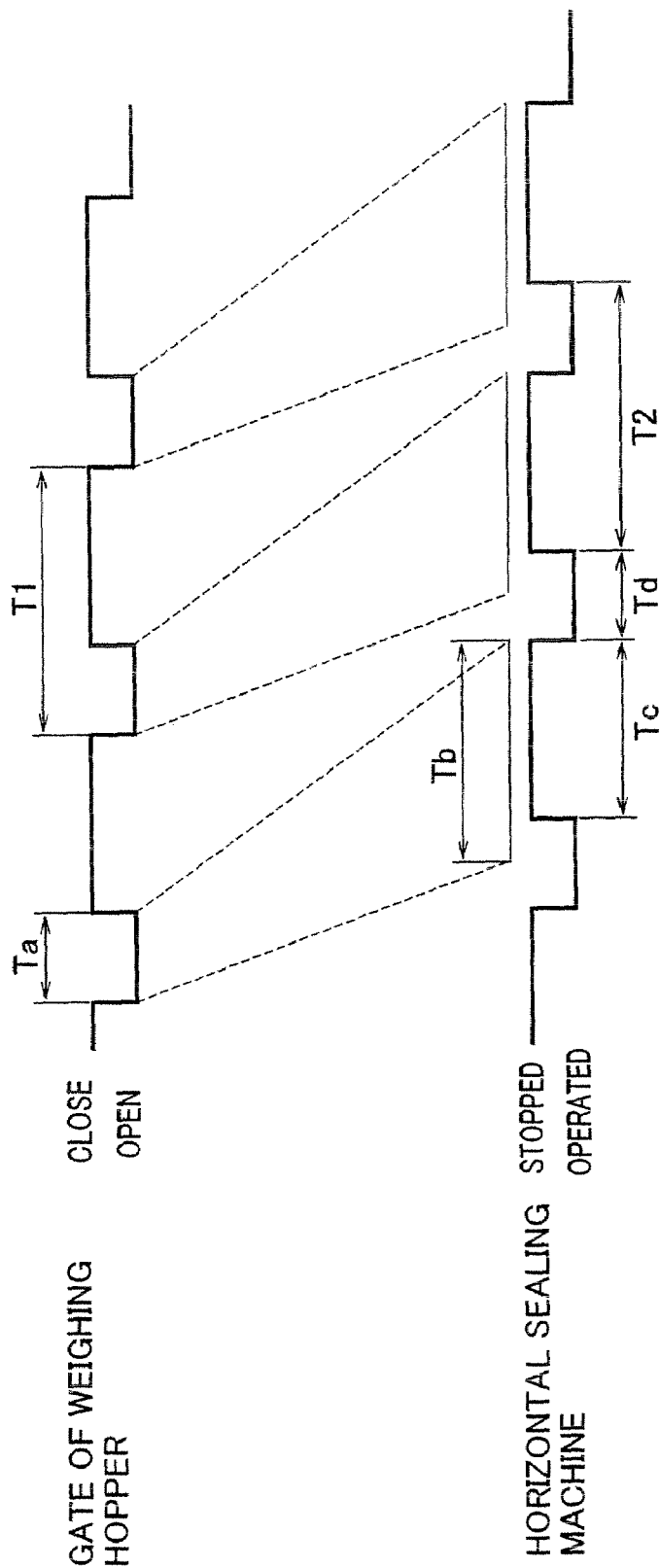
FIG. 5 is a timing chart showing an operation of a conventional combination weigher which is not equipped with a collecting hopper and a packaging machine.

The timing chart shown in FIG. 5 is for the case where the collecting hopper 4 is not equipped. In this case, since the bag accommodating time Tb required to accommodate from tip to tail of the batch of the objects to be weighed discharged from the combination weigher into the bag 28 of the packaging machine 21 is longer than the stopping time Tc of the horizontal sealing machine 25 of the packaging machine 21, the objects to be weighed arrive within the time of the operation of the horizontal sealing machine 25 and get stuck. Likewise, in the construction in FIG. 1, if the gate 5 of the collecting hopper 4 is not closed but always kept open, the objects to be weighed discharged from weighing hoppers 1 pass through the collecting hopper 4 and are accommodated into the bag 28, in which case the bag accommodating time Tb also becomes longer than the stopping time Tc of the horizontal sealing machine 25, so that the objects to be weighed get stuck at the horizontal sealing machine 25. If the bag accommodating time Tb is equal to or less than the stopping time Tc of the horizontal sealing machine 25, then the objects to be weighed can be prevented from getting stuck. However, in the case where all of the objects to be weighed discharged are temporarily accumulated in the collecting hopper 4 as illustrated by the timing chart in FIG. 6, there is a tendency that the objects to be weighed get jammed in the collecting hopper 4 or the like and fail to fall therefrom. This phenomenon is obviously observed especially in the case where the objects to be weighed are bulky (low in bulk density).

Accordingly, in this embodiment, the control unit 10 executes control such that the gate 5 of the collecting hopper 4 is closed before any part (the first-to-arrive part at the collecting hopper 4) of the objects to be weighed discharged from weighing hoppers 1 arrives at the collecting hopper 4, and the gate 5 of the collecting hopper 4 is opened before all of the objects to be weighed discharged from the weighing hoppers 1 arrive at the collecting hopper 4, and after a specified time Tf that elapses from when the gate 5 of the collecting hopper 4 is closed. By keeping the gate 5 of the collecting hopper 4 closed for the specified time Tf from prior to the arrival of the objects to be weighed at the collecting hopper 4, the bag accommodating time Tb can be decreased to be equal to or less than the stopping time Tc of the horizontal sealing machine 25, thereby preventing the objects to be weighed from being stuck at the horizontal sealing machine 25. Furthermore, by opening the gate 5 of the collecting hopper 4 before all of the objects to be weighed arrive at the collecting hopper 4, that is, by opening the gate 5 and discharging the objects to be weighed before all of the objects to be weighed discharged from the weighing hoppers 1 are accumulated in the collecting hopper 4, a smooth fall of the objects to be weighed from the collecting hopper 4 into the bag 28 can be achieved. Thus, the objects to be weighed can be prevented from getting jammed in the collecting hopper 4, inside the funnel 22 at the inlet of the packaging machine 21, inside the forming tube 23, and at the inlet of the packaging bag 28. As a result, the objects to be weighed can be properly accommodated into the packaging bag 28.

It should be noted that the timing of closing the gate 5 of the collecting hopper 4 needs to be set to that prior to the arrival of the first-to-arrive part of the objects to be weighed discharged from weighing hoppers 1 at the collecting hopper 4, and the gate 5 of the collecting hopper 4 may be closed or opened for a time period from time point in a preceding (last) cycle when the collecting hopper 4 discharged the objects to be weighed into the packaging machine and became empty immediately before the first-to-arrive part of the objects to be weighed discharged from the weighing hoppers 1 arrives at the collecting hopper 4 in a present (current) cycle. It is necessary that the gate 5 be closed immediately before the first-to-arrive part of the objects to be weighed arrives at the collecting hopper 4 at the latest.

Furthermore, as to the timing of opening the gate 5 of the collecting hopper 4, it is preferably opened as soon as possible after the first-to-arrive part of the objects to be weighed discharged from weighing hoppers 1 has arrived at the collecting hopper 4, in order to prevent the occurrence of bridging (jam) of the objects to be weighed. For example, the gate 5 is configured to be opened before approximately half the total quantity (or approximately half the target weight) of the objects to be weighed discharged from the weighing hoppers 1 selected to form a combination are accumulated in the collecting hopper 4. However, it is necessary that the bag accommodating time Tb be equal to or less than the stopping time Tc of the horizontal sealing machine 25. Accordingly, it is desirable to open the gate 5 of the collecting hopper 4 such that the bag accommodating time Tb is equal to or less than the stopping time Tc of the horizontal sealing machine 25, and in particular is substantially equal to the stopping time Tc.

Description will now be made of specific examples for controlling the gate opening and closing of weighing hoppers 1 and the collecting hopper 4 by the control unit 10 in this embodiment.

First, in a first control example, the packaging machine 21 outputs a discharge request signal to the control unit 10 of the combination weigher at, for example, a start time t1 of the sealing operation of its horizontal sealing machine 25. Receiving the discharge request signal, the control unit 10 opens the gate 5 of the collecting hopper 4 after a predetermined delay time T3, and closes the gate 5 after a predetermined gate open time Te. The control unit 10 also opens the gate 2 of the weighing hopper 1 after a predetermined delay time T4 after opening the gate 5 of the collecting hopper 4, and closes the gate 2 after a predetermined gate open time Ta. In this case, the specified time Tf for keeping the gate 5 of the collecting hopper 4 closed is the time obtained by subtracting the predetermined gate open time Te of the collecting hopper 4 from the discharge cycle time T1.

Next, in a second control example, the packaging machine 21 outputs a discharge request signal to the control unit 10 of the combination weigher at, for example, a termination time t2 of the sealing operation of its horizontal sealing machine 25. Receiving the discharge request signal, the control unit 10 opens the gate 2 of the weighing hopper 1 after a predetermined delay time T5, and closes the gate 2 after the predetermined gate open time Ta. The control unit 10 also closes the gate 5 of the collecting hopper 4 after a predetermined delay time T6 after opening the gate 2 of the weighing hopper 1, and opens the gate 5 after the predetermined gate close time Tf.

In either example, the timing when the packaging machine 21 outputs the discharge request signal is not limited to the start time t1 or the termination time t2 of the sealing operation by the sealing machine 25, but may be set at a predetermined point in its cycle time T2, with delay times being varied in accordance therewith so as to realize the operation as shown in FIG. 2. Moreover, the above first and second control examples are exemplary and other control methods may be employed so long as the operation shown in FIG. 2 is attained.

Figure 3:
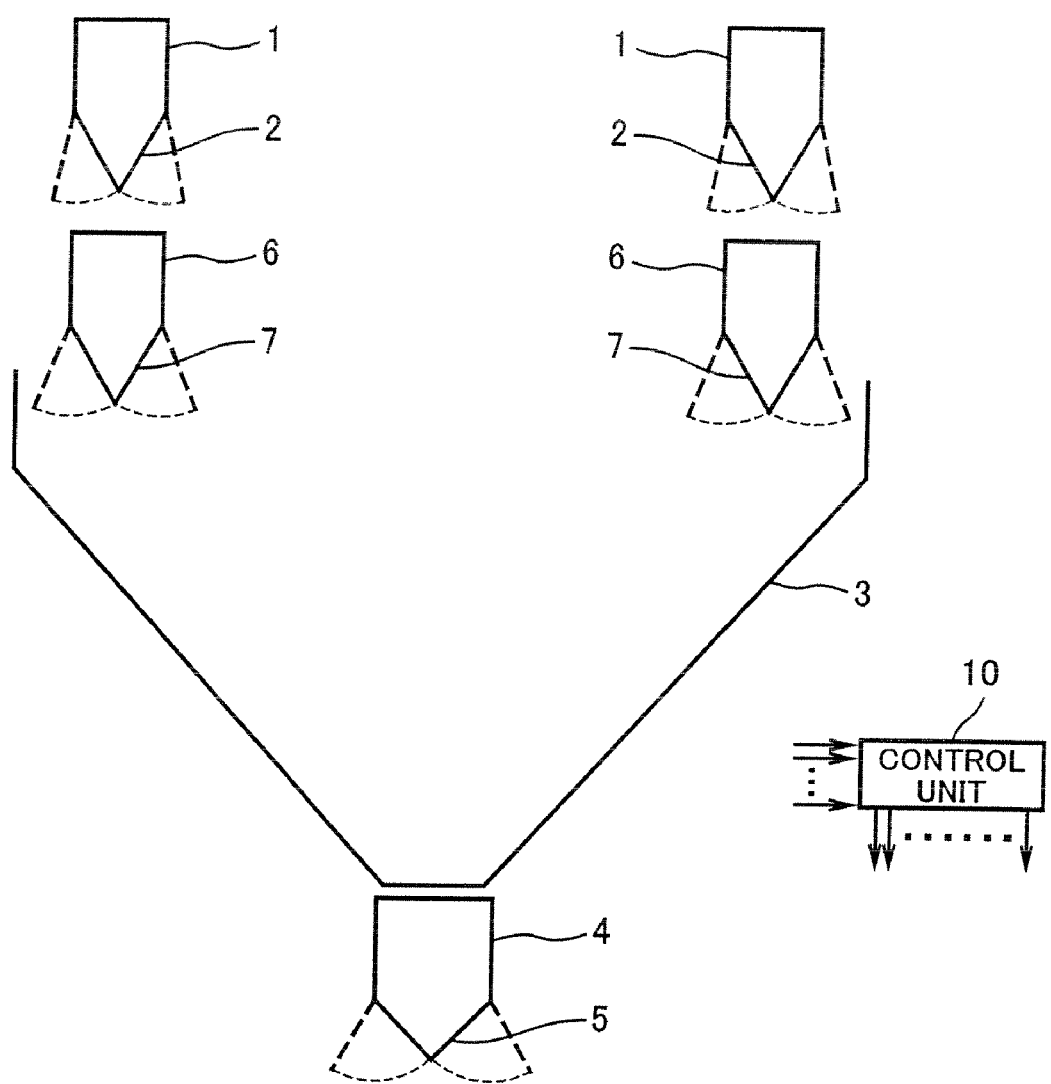
FIG. 3 is a schematic view showing a construction of another example of the combination weigher according to the embodiment of the present invention.

Whereas in the above embodiment, description has been given of the case where the hoppers that take part in the combination are weighing hoppers 1, a memory hopper 6 may be provided in correspondence to and directly below each weighing hopper 1 and may take part in the combination as shown in FIG. 3. In this case, the weighing hoppers 1 do not take part in the combination, but feed the objects to be weighed into the memory hoppers 6 when the memory hoppers 6 become empty. By the combination calculation performed by the control unit 10, a combination of hoppers accommodating the objects to be weighed whose total weight of the objects falls within an allowable range with respect to the target weight is selected from among a plurality of memory hoppers 6, and the objects to be weighed are discharged from the hoppers forming that combination onto the collecting chute 3. As the weight of the objects to be weighed in each memory hopper 6, the weight of the objects to be weighed that has been measured in the weighing hopper 1 thereabove is used in the combination calculation. In this case, the gate opening and closing timing for the weighing hopper as shown in FIG. 2 becomes the timing of opening and closing the gate 7 of the memory hoppers 6 selected to form the combination in FIG. 3. Incidentally, in the construction of FIG. 3, on condition that a weighing hopper 1 and its corresponding memory hopper 6 are both selected simultaneously to form a combination, weighing hoppers 1 may also be allowed to take part in the combination. For example, if a corresponding weighing hopper 1 and memory hopper 6 are selected simultaneously, the objects to be weighed in the weighing hopper 1 are discharged through the memory hopper 6 onto the collecting chute 3. In this case, the gate opening and closing timing of the weighing hopper shown in FIG. 2 becomes the gate opening and closing timing of the weighing hopper 1 and memory hopper 6 selected to form the combination.

Figure 4:
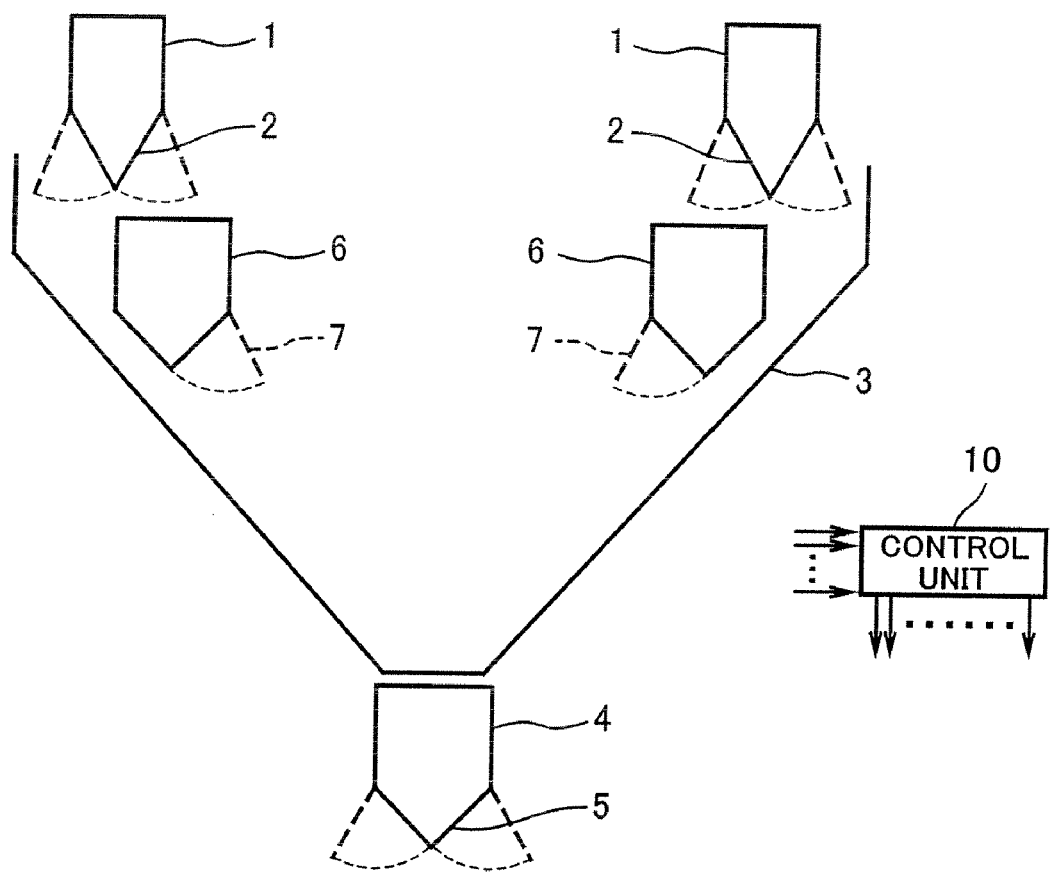
FIG. 4 is a schematic view showing a construction of yet another example of the combination weigher according to the embodiment of the present invention.

Whereas in the above embodiment, description has been given of where the hoppers that take part in the combination are only weighing hoppers 1, a memory hopper 6 may be provided in correspondence to and obliquely downward of each weighing hopper 1 as shown in FIG. 4 so that both the weighing hopper 1 and the memory hopper 6 take part in the combination. In this case, the weighing hopper 1 is configured to selectively discharge the objects to be weighed to the collecting chute 3 or to the memory hopper 6. The memory hopper 6 is fed with the objects to be weighed from the weighing hopper 1 when the memory hopper 6 becomes empty. By the combination calculation performed by the control unit 10, a combination of hoppers accommodating the objects to be weighed whose total weight falls within an allowable range with respect to the target weight, is selected from among a plurality of weighing hoppers 1 and memory hoppers 6, and the objects to be weighed are discharged from the hoppers forming that combination onto the collecting chute 3. As the weight of the objects to be weighed in each memory hopper 6, the weight of the objects to be weighed that has been measured in the weighing hopper 1 thereabove is used in the combination calculation. In this case, the gate opening and closing timing of the weighing hopper shown in FIG. 2 becomes the gate opening and closing timing of the weighing hoppers 1 and memory hoppers 6 selected to form the combination in FIG. 4. In this case, furthermore, by setting the total number of weighing hoppers 1 and memory hoppers 6 equal to the number of weighting hoppers 1 in the construction of FIG. 1, it becomes possible to achieve substantially the same performance as in FIG. 1 where only weighing hoppers 1 are provided as the hoppers that take part in the combination. As a result, the number of expensive load sensors (not shown) attached to the weighing hoppers 1 can advantageously be reduced by half.

Moreover, the control unit 10 shown in FIGS. 1, 3, and 4 is not limited to being configured as the single control apparatus, but instead may be configured to include a plurality of control apparatuses which are disposed in a distributed manner, and co-operate to control the operation of the combination weigher.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

INDUSTRIAL APPLICABILITY

The combination weigher of the disclosed example of the present invention is useful as a combination weigher which deals with objects to be weighed that are bulky (small in bulk density) and so on.

The invention claimed is:

1. A combination weigher comprising:
   a plurality of combination hoppers that are fed with objects to be weighed;
   a collecting chute disposed below the plurality of combination hoppers, which collects the objects to be weighed discharged from the combination hoppers and discharges the objects to be weighed through an outlet provided at a lower part thereof;
   a collecting hopper provided at the outlet of the collecting chute, which, with a gate provided at a lower part thereof closed, receives the objects to be weighed discharged from the outlet of the collecting chute, and, with the gate opened, allows the objects to be weighed to fall into bags manufactured by a packaging machine; and
   a control means which determines a combination of combination hoppers that discharges the objects to be weighed, from among the plurality of combination hoppers, and causes the combination hoppers forming the determined combination to discharge the objects to be weighed, and which controls opening and closing of the gate of the collecting hopper,
   the combination weigher having a relationship with the packaging machine in which, a bag accommodating time required to accommodate from a first-to-arrive to last-to-arrive portion of the objects to be weighed falling from the collecting hopper into the bag in a case where the gate of the collecting hopper is always kept open and the objects to be weighed discharged from the combination hoppers are allowed to pass through the collecting hopper, is longer than a seal stopping time after completion of sealing a lower end of any one of the bags successively manufactured by the packaging machine before start of sealing an upper end of the bag,
   wherein the control means causes the gate of the collecting hopper to be closed immediately before any portion of the objects to be weighed discharged from the combination hoppers arrives at the collecting hopper at the latest, and causes the gate of the collecting hopper to be opened before all of the objects to be weighed arrive at the collecting hopper and after a specified time that elapses from when the gate of the collecting hopper is closed, such that by keeping the gate of the collecting hopper closed for the specified time, the bag accommodating time is reduced to be equal to or less than the seal stopping time of the packaging machine.

2. The combination weigher according to claim 1, wherein the combination hoppers are weighing hoppers that weigh the weight of the objects to be weighed fed thereinto.

3. The combination weigher according to claim 1, further comprising a weighing hopper disposed in correspondence to and above each of the combination hoppers, for weighing the weight of the objects to be weighed fed thereinto,
   wherein the combination hoppers are memory hoppers that are fed with the objects to be weighed whose weight has been measured in the weighing hoppers.

4. The combination weigher according to claim 1, wherein the plurality of combination hoppers are disposed in two, upper and lower lines, the combination hoppers in the upper line being weighing hoppers for weighing the weight of the objects to be weighed fed thereinto, and the combination hoppers in the lower line being memory hoppers which are respectively provided in correspondence to the weighing hoppers and fed with the objects to be weighed having been weighed in the weighing hoppers, and wherein the weighing hoppers selectively discharge the objects to be weighed to the corresponding memory hoppers or to the collecting chute.

* * * * *